(12) United States Patent
Yadav et al.

(10) Patent No.: US 12,670,273 B2
(45) Date of Patent: Jun. 30, 2026

(54) METHODS AND SYSTEMS FOR DETECTING HIDING AND DATA INTELLIGENCE GATHERING IN DATA LAKES AND CLOUD WAREHOUSING

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Sankuratri, Cupertino, CA (US); Danesh Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Pramod Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 0 days.

(21) Appl. No.: 18/227,223

(22) Filed: Jul. 27, 2023

(65) Prior Publication Data

US 2025/0124149 A1 Apr. 17, 2025

Related U.S. Application Data

(63) Continuation-in-part of application No. 18/203,045, filed on May 29, 2023, which is a continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*G06F 21/62* (2013.01)
*G06F 16/25* (2019.01)

(52) U.S. Cl.
CPC ............ *G06F 21/62* (2013.01); *G06F 16/254* (2019.01)

(58) Field of Classification Search
CPC .............................. G06F 21/62; G06F 16/254
See application file for complete search history.

(56) References Cited

U.S. PATENT DOCUMENTS

| | | | | |
|---|---|---|---|---|
| 7,529,187 | B1 * | 5/2009 | Hernacki ............ | H04L 63/1416 726/28 |
| 2021/0067553 | A1 * | 3/2021 | Ries .................... | H04L 63/0263 |
| 2022/0128985 | A1 * | 4/2022 | Szigeti ............... | G05B 23/0256 |
| 2024/0106664 | A1 * | 3/2024 | Yang .................... | H04L 9/0866 |

* cited by examiner

*Primary Examiner* — Thaddeus J Plecha

(57) ABSTRACT

In one aspect, a computerized method for detecting hiding and data intelligence gathering in a data lake or a cloud warehouse, comprising: implementing a hiding and data intelligence collection analysis phase in the data lake or the cloud warehouse; implementing a discovery process in the data lake or the cloud warehouse; implementing a data gathering process in the data lake or the cloud warehouse; and performing one or more dynamic masking operations to detect a Dynamic Masking column anomalies and to detect one or more atypical commands in the data lake or the cloud warehouse.

20 Claims, 24 Drawing Sheets

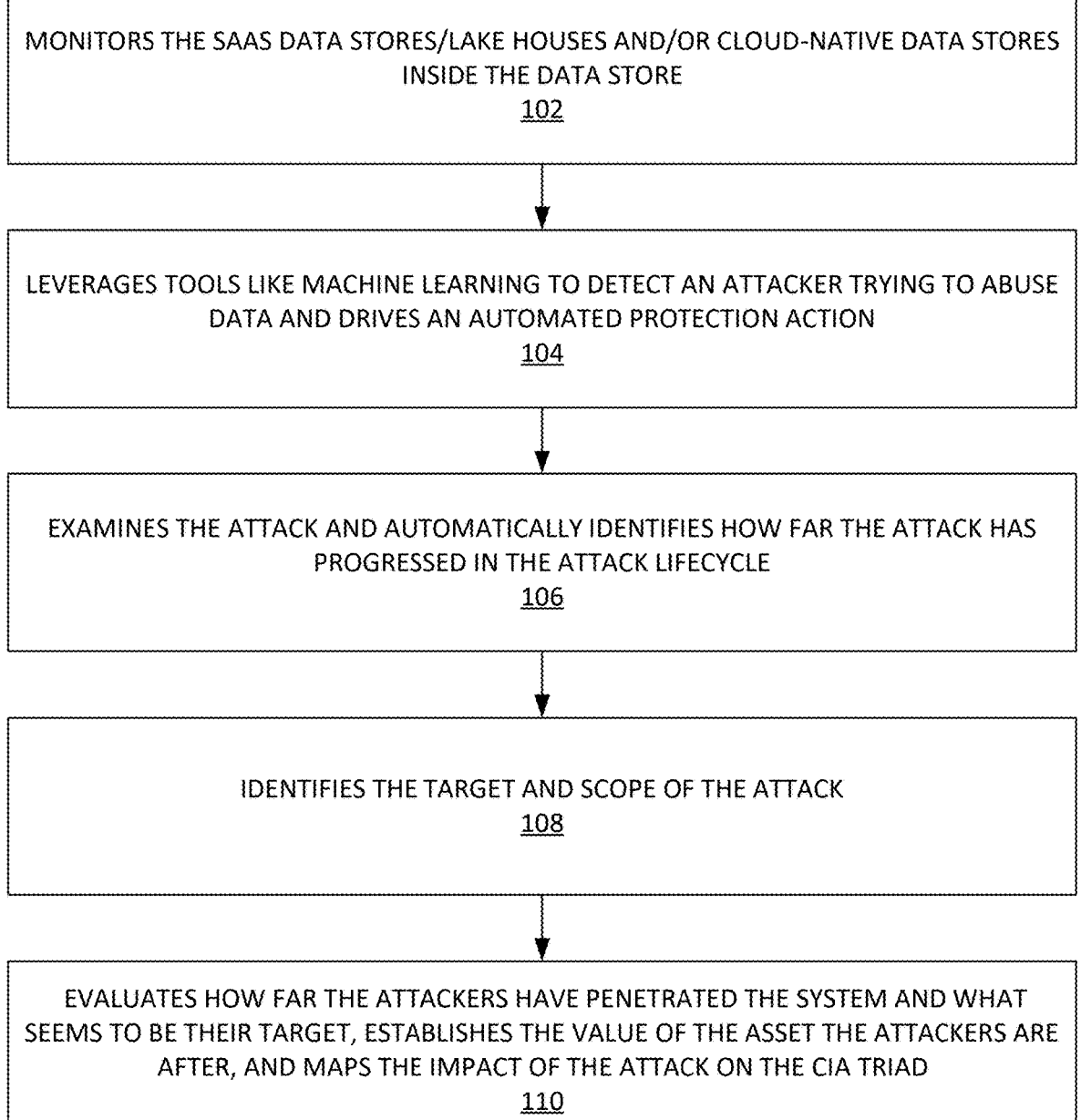

MONITORS THE SAAS DATA STORES/LAKE HOUSES AND/OR CLOUD-NATIVE DATA STORES INSIDE THE DATA STORE
102

LEVERAGES TOOLS LIKE MACHINE LEARNING TO DETECT AN ATTACKER TRYING TO ABUSE DATA AND DRIVES AN AUTOMATED PROTECTION ACTION
104

EXAMINES THE ATTACK AND AUTOMATICALLY IDENTIFIES HOW FAR THE ATTACK HAS PROGRESSED IN THE ATTACK LIFECYCLE
106

IDENTIFIES THE TARGET AND SCOPE OF THE ATTACK
108

EVALUATES HOW FAR THE ATTACKERS HAVE PENETRATED THE SYSTEM AND WHAT SEEMS TO BE THEIR TARGET, ESTABLISHES THE VALUE OF THE ASSET THE ATTACKERS ARE AFTER, AND MAPS THE IMPACT OF THE ATTACK ON THE CIA TRIAD
110

PERFORM THE HIDING AND DATA INTELLIGENCE COLLECTION PHASE OF THE ATTACK
202

ANALYSIS THE DATA GATHERING PHASE OF THE ATTACK
204

USE FINGERPRINTING ON USERS TO IDENTIFY IF ANY USER HAS NOT DONE SUCH METADATA ACTIVITY IN THE PAST AND EXTENDS THE MODEL TO DETERMINE THAT THE CURRENT DISCOVERY ACTIVITY POSES HARM FROM THE DATA EXFILTRATION CONTEXT
206

| | | |
|---|---|---|
| SA_DORMS_DVG_PUR_ETL_TEST | 0 | Never |
| KAITLIN_PARNELLA | 1 | 3 months ago |
| JUSTIN_YOUNG | 1 | 2 months ago |
| SA_TABLEAU_REP_DEV | 1 | 2 months ago |
| SA_ADT_ALCRT_RD_IM_DEV | 1 | 2 months ago |
| SA_ADT_TRADH_RD_IM_DEV | 1 | 2 months ago |
| POOJA_BHATT | 2 | 3 months ago |
| SA_DSS_DMF_ETL_DEV | 2 | 2 months ago |
| ALI_DIDEHVAR | 2 | 18 days ago |
| CAMILO_MANCILLA | 3 | 15 days ago |
| NMSAA_PYTHON_READ | 3 | 3 months ago |
| MAHTAB_PARSANEHR | 3 | 18 days ago |
| RAKESH_GUNDALA | 5 | 35 days ago |
| NMSAA_PYTHON_READ_TEST | 6 | 2 months ago |

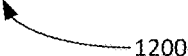

18 Infrequently Used Roles

| Role | Last Used | Financial Value | Accessible Tables | Accessible Entities |
|---|---|---|---|---|
| DORMS_BUS_PRM_ETL | Never | $1.8 B | 69 | 10 |
| DORMS_BUS_PUB_ETL | Never | $1.8 B | 88 | 10 |
| DORMS_BUSINESS_USER_READ_NON_PII | Never | $18.3 B | 23 | 4 |
| DORMS_BUSINESS_USER_READ_PII | Never | $366.4 B | 46 | 6 |
| DORMS_DEVELOP_RDWR_NON_PII | Never | $1.8 B | 32 | 10 |
| SV_ADMIN | Never | $1.8 B | 131 | 11 |
| DORMS_TABLEAU_REP_ROLE | Never | $1.8 B | 32 | 10 |
| DORMS_DEVELOP_RDWR_PII | 12 days ago | $661.1 B | 61 | 7 |
| DORMS_PYTHON_READ | 8 days ago | $366.3 B | 88 | 6 |
| AA_DORMS_READ | 7 days ago | $661.8 B | 63 | 6 |
| SYSADMIN | 7 days ago | $1.8 B | 155 | 11 |
| SV_READ_ALL_NON_PII | 6 days ago | $1.8 B | 153 | 11 |
| DORMS_TABLEAU_PII_REP_ROLE | 5 days ago | $1.8 B | 151 | 11 |
| DORMS_DOMO_REP_ROLE | 5 days ago | $366.3 B | 88 | 6 |

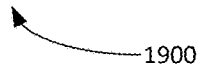

172 Infrequently Accessing Users

| User | Recent Logins | Last Login ↓ |
|------|---------------|--------------|
| RAKESH_BANDLA | 4 | 18 days ago |
| CAROL_MANCELLA | 2 | 18 days ago |
| MARTAG_PARDAMEHR | 3 | 18 days ago |
| ALI_BOKHARI | 2 | 18 days ago |
| SA_TABLEAU_REP_TEST | 6 | a month ago |
| SA_ADT_TRADH_BD_RR_DEV | 1 | 2 months ago |
| SA_ADT_ALORT_BD_RR_DEV | 1 | 2 months ago |
| MMSAA_PYTHON_READ_TEST | 6 | 2 months ago |
| SA_TABLEAU_BDA_DEV | 1 | 2 months ago |
| GLENDRA | 9 | 2 months ago |
| SA_DXOS_DME_ETL_DEV | 3 | 2 months ago |
| JUSTIN_YOUNG | 1 | 2 months ago |
| MMSAA_PYTHON_READ | 3 | 3 months ago |
| 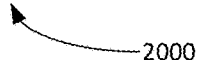_SHATI | 3 | 3 months ago |
| KAITLIN_PARRELLA | 1 | 3 months ago |

| | | |
|---|---|---|
| SA_DORMS_BUS_PUB_ETL_TEST | 0 | Never |
| KAITLIN_FARINELLA | 1 | 3 months ago |
| JUSTIN_YOUNG | 1 | 2 months ago |
| SA_TABLEAU_REP_DEV | 1 | 2 months ago |
| SA_ADT_ALCRT_RD_IM_DEV | 1 | 2 months ago |
| SA_ADT_TRACK_RD_IM_DEV | 1 | 2 months ago |
| POOJA_BRATT | 2 | 3 months ago |
| SA_D365_DMF_ETL_DEV | 2 | 2 months ago |
| ALI_DIDEHVAR | 2 | 13 days ago |
| CAMILO_MANCILLA | 2 | 15 days ago |
| NMSAA_PYTHON_READ | 3 | 3 months ago |
| MAHTAB_PARSAMEHR | 3 | 18 days ago |
| RAKESH_GUNDALA | 5 | 13 days ago |
| NMSAA_PYTHON_READ_TEST | 6 | 2 months ago |

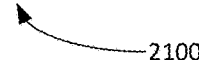

IMPLEMENT A HIDING AND DATA INTELLIGENCE COLLECTION ANALYSIS PHASE
2302

IMPLEMENT DEFENSE EVASION ANALYSIS
2304

IMPLEMENT A DISCOVERY PROCESS
2306

IMPLEMENT A DATA GATHERING PROCESS
2308

IMPLEMENT DYNAMIC MASKING OPERATIONS
2310

2300

METHODS AND SYSTEMS FOR DETECTING HIDING AND DATA INTELLIGENCE GATHERING IN DATA LAKES AND CLOUD WAREHOUSING

CLAIM OF PRIORITY

This application claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 18/203,045, filed on 29 May 2023 and titled METHODS AND SYSTEMS FOR ATTACK GENERATION ON DATA LAKES. The U.S. patent application Ser. No. 18/203,045 is hereby incorporated by reference in its entirety.

U.S. patent application Ser. No. 18/203,045 claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, detecting hiding and data intelligence gathering in data lakes and cloud warehousing.

BACKGROUND

Data is the most critical asset of any enterprise. Almost all cyber security tools and techniques invented and deployed to date focus on protecting the data by proxy. They either focus on protecting the server/application or the endpoints (e.g. desktop, laptop, mobile, etc.) and, by proxy, assume the data is protected. A paradox in the cyber security industry is that data breaches are growing and measured by any metric with every passing day. Despite more money and resources being deployed into cyber security solutions, existing approaches must be revised, begging for a new solution.

SUMMARY OF THE INVENTION

In one aspect, a computerized method for detecting hiding and data intelligence gathering in a data lake or a cloud warehouse, comprising: implementing a hiding and data intelligence collection analysis phase in the data lake or the cloud warehouse; implementing a discovery process in the data lake or the cloud warehouse; implementing a data gathering process in the data lake or the cloud warehouse; and performing one or more dynamic masking operations to detect a Dynamic Masking column anomalies and to detect one or more atypical commands in the data lake or the cloud warehouse.

BRIEF DESCRIPTION OF THE DRAWINGS

FIG. 1 illustrates an example process for detecting hiding and data intelligence gathering in data lakes and cloud warehousing, according to some embodiments.

FIGS. 6-10 illustrates an example screenshots of discovery operations, according to some embodiment.

FIGS. 11-12 illustrate example screenshots of discovery operations, according to some embodiment.

FIGS. 19-22 illustrates example screenshots illustrating operations to detect atypical commands, according to some embodiments.

Figure 2:
FIG. 2 illustrates another example process for detecting hiding and data intelligence gathering in data lakes and cloud warehousing, according to some embodiments.

The Figures described above are a representative set and are not exhaustive with respect to embodying the invention.

DESCRIPTION

Disclosed are a system, method, and article for detecting hiding and data intelligence gathering in data lakes and cloud warehousing. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

CIA triad (confidentiality, integrity and availability) of information security.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

Cloud data warehouse is a cloud-based data warehouse. Cloud data warehouse can be used for storing and managing large amounts of data in a public cloud. Cloud data warehouse can enable quick access and use of an entity's data.

Dark web is the World Wide Web content that exists on darknets: overlay networks that use the Internet but require specific software, configurations, or authorization to access. Through the dark web, private computer networks can communicate and conduct business anonymously without divulging identifying information, such as a user's location.

DBaaS (Database as a Service) can be a cloud computing service that provides access to and use a cloud database system.

Data lake is a system or repository of data stored in its natural/raw format. A data lake can be object blobs or files.

A data lake is usually a single store of data including raw copies of source system data, sensor data, social data etc. A data lake can include various transformed data used for tasks such as reporting, visualization, advanced analytics, and machine learning. A data lake can include structured data from relational databases (rows and columns), semi-structured data (e.g. CSV, logs, XML, JSON), unstructured data (e.g. emails, documents, PDFs) and binary data (e.g. images, audio, video). A data lake can be established "on premises" (e.g. within an organization's data centers) or "in the cloud" (e.g. using cloud services from various vendors).

Malware is any software intentionally designed to disrupt a computer, server, client, or computer network, leak private information, gain unauthorized access to information or systems, deprive access to information, or which unknowingly interferes with the user's computer security and privacy. Researchers tend to classify malware into one or more sub-types (e.g. computer viruses, worms, Trojan horses, ransomware, spyware, adware, rogue software, wiper and keyloggers).

Privilege escalation can be the act of exploiting a bug, a design flaw, or a configuration oversight in an operating system or software application to gain elevated access to resources that are normally protected from an application or user. The result can be that an application with more privileges than intended by the application developer or system administrator can perform unauthorized actions.

Tactics, techniques, and procedures (TTPs) are the patterns of activities or methods associated with a specific threat actor or group of threat actors.

Example Methods

Example techniques for detecting hiding and data intelligence gathering in data lakes and cloud warehousing are provided (e.g. processes 100-200, 2300, etc.). These techniques detect when an attacker attempts to hide from detection. When an attacker is hiding within a cloud data store or a warehouse, he/she is using a lot of native capabilities, whether from disabling notifications or clearing the logs. The present techniques natively detect any hiding attempts and brings them to the foray of enterprises so that such attack attempts can be detected early and stopped. Protecting the data stored from inside functions like human antibodies detecting infection and protecting the human body. Antibodies do a better job of protecting the body from viruses or foreign objects than externally administered drugs. This was brought to the general public's consciousness during the Covid pandemic. People with well-tailored or well-boosted immune systems handled the covid virus better. Similarly, an intrusion detection and protection system embedded into the data store and is well dispersed in the data stores watches every interaction with the data and identifies what's normal for what type of role and user with what type of data. The moment the malware or malicious human tries to access or manipulate data or the structure of the data or policies/governance constructs surrounding the data, the system in real-time swings into action with a very tailored plus measured response to neutralize the damage.

FIG. 1 illustrates an example process 100 for detecting hiding and data intelligence gathering in data lakes and cloud warehousing, according to some embodiments. In step 102, process 100 monitors the SaaS data stores/lake houses (e.g. Snowflake, DataBricks, AWS RedShift, Azure Synapse, and GCP BigQuery) and/or cloud-native data stores inside the data store. In step 104, process 100 leverages tools like machine learning to detect an attacker (human or malware) trying to abuse data and drives an automated protection action. Example machine learning methods that can be used in some embodiments are provided infra.

In step 106, process 100 examines the attack and automatically identifies how far the attack has progressed in the attack lifecycle (e.g. attack kill chain). This step provides a sense of response time to the humans protecting the system when operating a data lakes and cloud warehousing defenses in a manual and/or hybrid mode. It can tell administrators how long they have left before the damage from the attackers is permanent.

In step 108, process 100 identifies the target and scope of the attack. This further enables the human operators to prioritize the attack response because process 100 assesses the impact of the attack and the ramifications of the attack. Process 100 also auto-classifies the data inside the data stores and establishes the financial value of the data by using pricing signals from the data bounties on the dark web. It establishes the minimum dollar value of the data. Further, by examining the sequence of attack steps/commands being executed, process 100 establishes the target of the attack, the scope, and how the data will be compromised (e.g. will confidentiality (data leak) or integrity (data maliciously be manipulated) or availability (ransomware) of the data being compromised)).

In step 110, process 100 evaluates how far the attackers have penetrated the system and what seems to be their target, establishes the value of the asset the attackers are after, and maps the impact of the attack on the CIA triad. This enables security practitioners to look at the attack as it builds out and take the remediation action with full view. Process 100 can use advanced forensic techniques natively running within the cloud data stores to detect data intelligence gathering signals from the attackers' perspective.

FIG. 2 illustrates another example process for detecting hiding and data intelligence gathering in data lakes and cloud warehousing, according to some embodiments.

In step 202, process 200 performs the hiding and data intelligence collection phase of the attack. In this phase of the attack, the attacker or malware does two things, hides its presence from detection and surveys the data store to determine what data is worth abusing or exfiltrating from the data store. Process 200 can detect defense evasion techniques that are used by attackers natively within a cloud data warehouse and data lakes. These can include, inter alia: Network policy modifications (e.g. creating a new network policy, altering network policy using IP lists to hide the exact IP, changing network policy associated with specific roles (e.g. users with infrequent access, etc.)). Process 200 can identify if a user who has not accessed the warehouse or table starts reading data, specifically the ones that manage preferences, metadata, or information about the integrations. The defense evasion step requires the attacker to hide himself or herself so that no one will notice their presence. This gives the attacker time to do their work with relative peace. Defense evasion performed successfully leads to persistence wherein the attacker can keep repeating or making his/her way into the cloud environment. It is further noted that the credential access and discovery step involve accessing the credential to the system and discovering the lay of the land (e.g. survey, etc.) inside the data store, as discussed above.

In step 204, process 200 analysis the data gathering phase of the attack. The data gathering involves the attacker collecting the data of interest to the attacker stored inside the data store and preparing it for either exfiltration or abuse (e.g. an availability attack like ransomware or an integrity attack that modifies the data, etc.). Here, process 200 can detect that the attacker uses a sequence lateral moves to obtain to the right warehouse, database, or table using the appropriate roles. This movement is the lateral movement step and is executed before the data collection step. Lateral movements include moving to a diff database or using a diff table, or running a new stored procedure that the user never ran before. These can be examples.

Process 200 identifies data gathering signals including (e.g. unauthorized access, etc.). Process 200 identifies the number of unauthorized access attempts and if there is an upshot trend for a specific user or attribute that can cause an unauthorized access to go up. If an attacker is trying to evade defenses, they can make a lot of attempts at running administrative or privileged commands which leads to unauthorized access as well. This can be a form of discovery activity. Here, as an attacker navigates a new environment, process 200 identifies the discovery activity. Discovery activity can include: tables and views metadata; integrations that are in there in the data lake, functions and procedures; users and roles/groups/privileges; etc.

In step 206, process 200 uses fingerprinting on users to identify if any user has not done such metadata activity in the past and extends the model to determine that the current discovery activity poses harm from the data exfiltration context.

Figure 3:
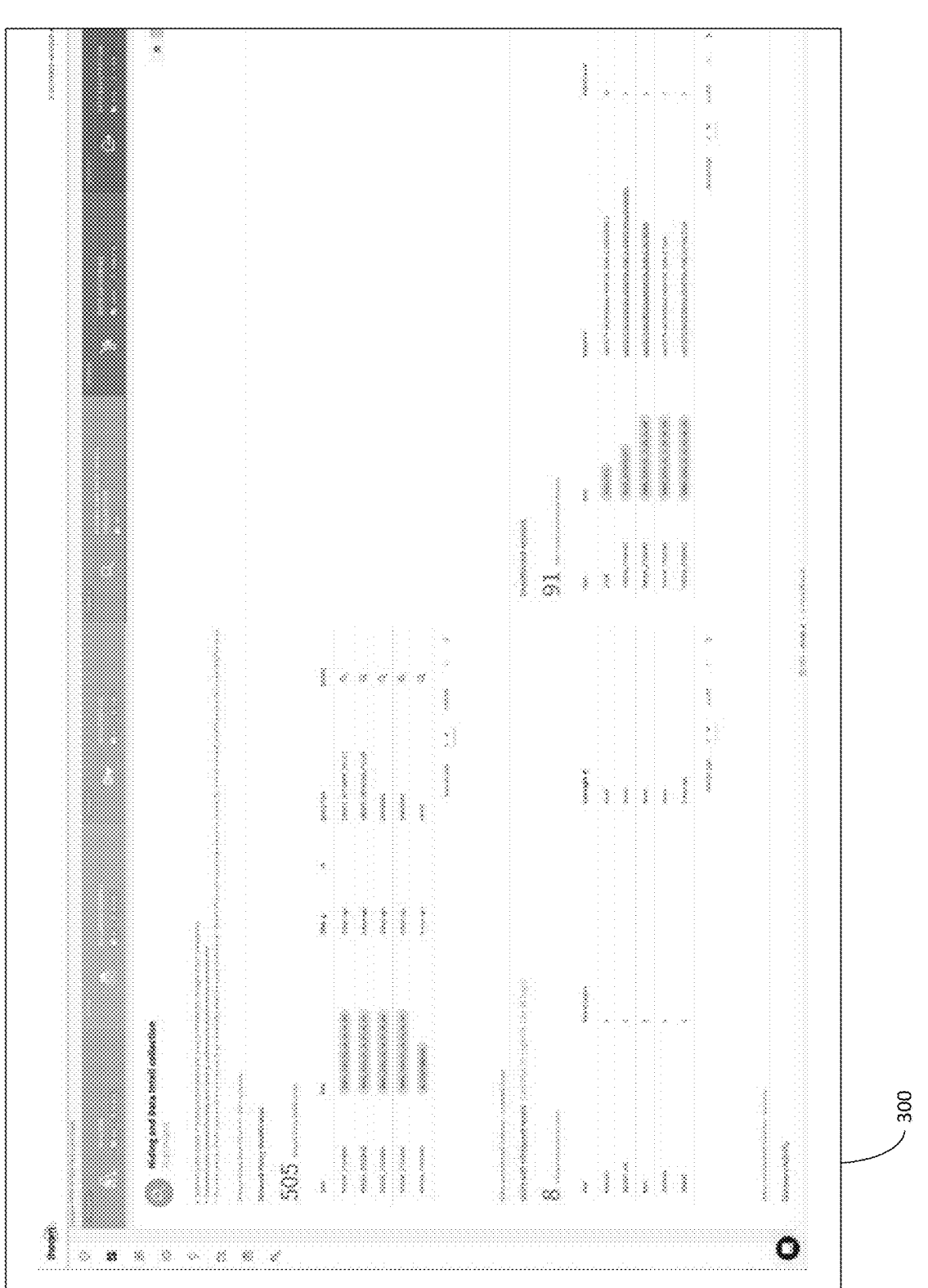
FIGS. 3 and 4 illustrate example screenshots showing an analysis of a hiding and data intelligence collection phase of the attack, according to some embodiments.
Figure 4:
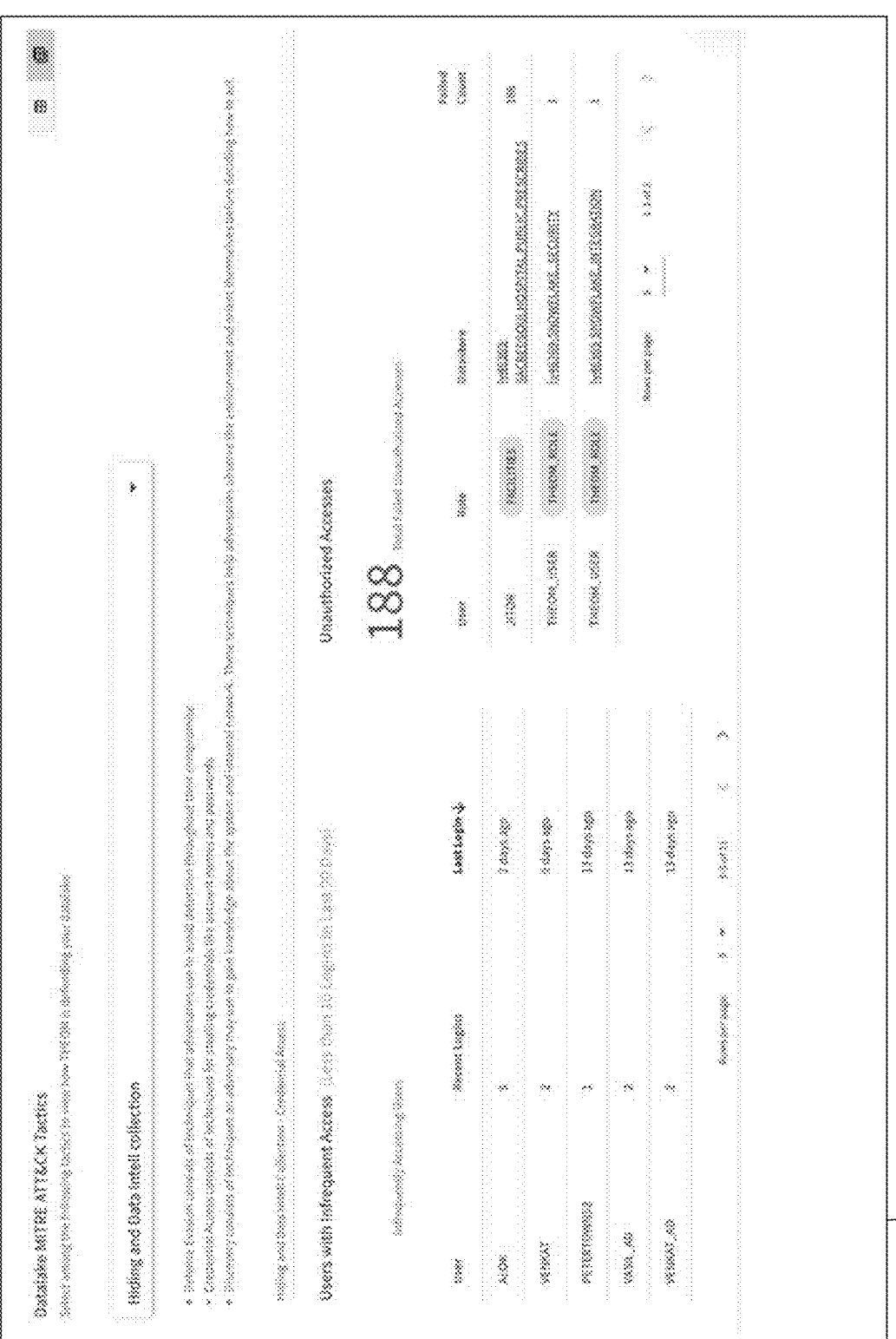
Figure 23:
FIG. 23 illustrates an example process for detecting hiding and data intelligence gathering in data lakes and cloud warehousing, according to some embodiments.

FIG. 23 illustrates an example process 2300 for detecting hiding and data intelligence gathering in data lakes and cloud warehousing, according to some embodiments. In step 2302, process 2300 implements a hiding and data intelligence collection analysis phase. FIGS. 3 and 4 illustrate example screenshots showing analyzing of a hiding and data intelligence collection phase of the attack, according to some embodiments.

In step 2304, process 2300 implement defense evasion analysis. Process 2300 can use a truncate or similar command (e.g. DROP, TRUNC) on the following tables can indicate elevated scenarios of evasion. These tables include, inter alia: access_history, login_history, Query_history, etc. An Access_history table provides a view and refers to when the user query reads data and when the SQL statement performs a data write operation, such as INSERT, UPDATE, and DELETE along with variations of the COPY command, from the source data object to the target data object. b. login_history table—The LOGIN_HISTORY family of table functions can be used to query login attempts data lake users along various dimensions: i. LOGIN_HISTORY returns login events within a specified time range. ii. LOG-IN_HISTORY_BY_USER returns login events of a specified user within a specified time range. iii. Query_history table—The QUERY_HISTORY family of table functions can be used to query data lake query history along various dimensions: 1. QUERY_HISTORY returns queries within a specified time range. 2. QUERY_HISTORY_BY_SESSION returns queries within a specified session and time range. 3. QUERY_HISTORY_BY_USER returns queries submitted by a specified user within a specified time range. 4. QUE-RY_HISTORY_BY_WAREHOUSE returns queries executed by a specified warehouse within a specified time range.

Figure 5:
FIG. 5 illustrates a screenshot for defense evasion analysis, according to some embodiments.
Figure 6:
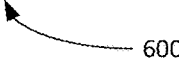
Figure 7:
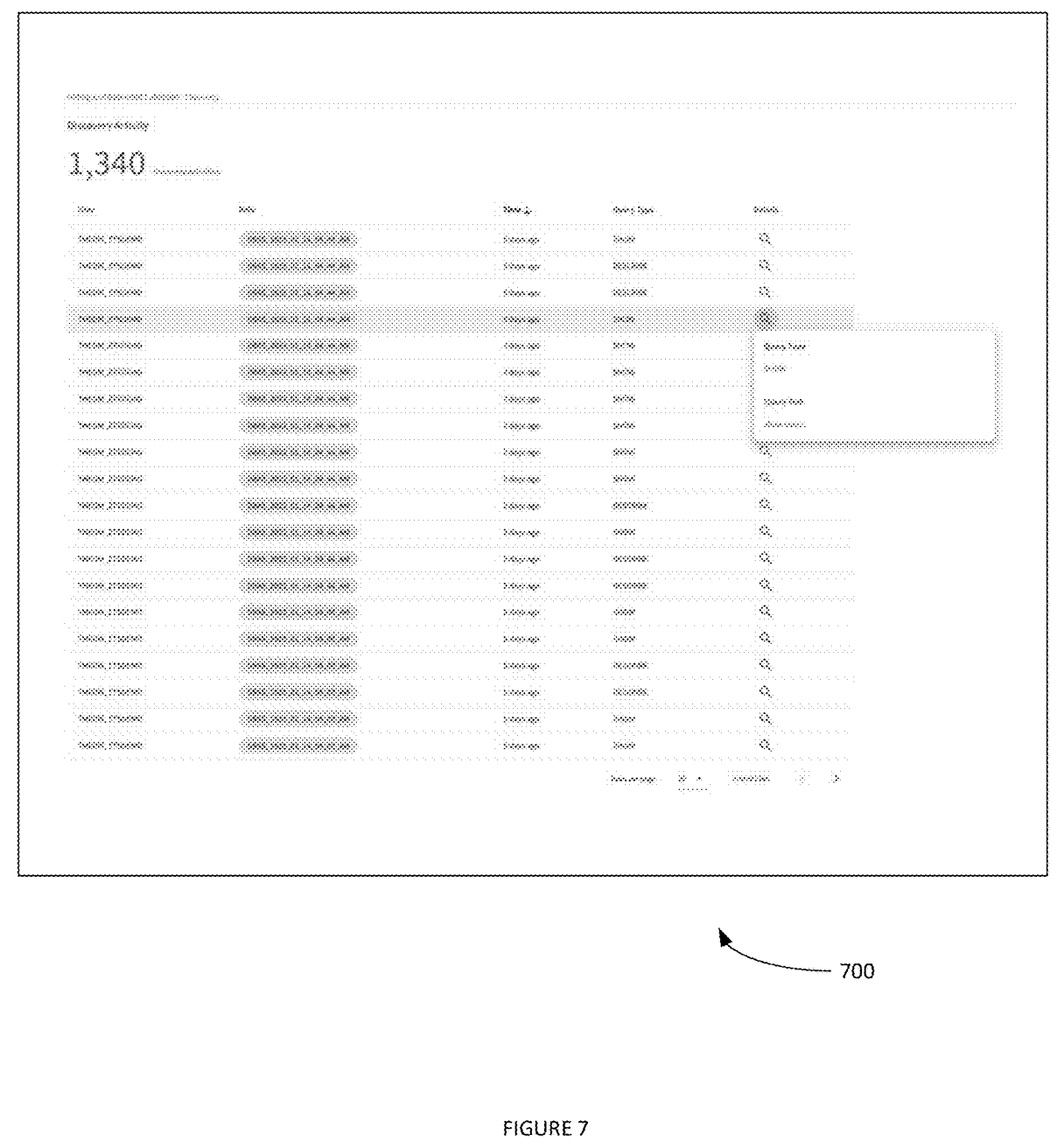
Figure 8:
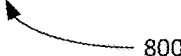
Figure 9:
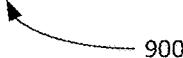
Figure 10:
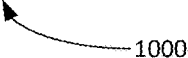

FIG. 5 illustrates a screenshot 500 for defense evasion analysis, according to some embodiments. FIGS. 6-10 illustrates an example screenshots of discovery operations, according to some embodiment. Example defense evasion analysis operations can include a drop operation (e.g. to determine, inter alia: connection, database, external table, failover group, file format, integrations, managed account, network policy, password policy, pipe, replication group, resource monitor, role, row access policy, schema, session policy, share, stage, stream, table, tag, task, user, view, Warehouse, etc.) Example defense evasion analysis operations can include an explain operation (e.g. to determine, inter alia: execution plan for SQL, etc.). Example defense evasion analysis operations can include a remove operation. Example defense evasion analysis operations can include a revoke global privileges operation (e.g. to determine, inter alia: Revoke Privileges from, Role, resource monitors, virtual warehouses, databases, schemas, tables, views, stages, file formats, UDFs, Sequences, etc.). Example defense evasion analysis operations can include a rollback operation. Example defense evasion analysis operations can include an explain operation. (e.g. to determine, inter alia: Create Security Integration, External OAUTH, OAUTH, SAML2, SCIM, etc.) Example defense evasion analysis operations can include a Create Session Policy operation (e.g. to determine, inter alia: idle timeout, idle timeout UI, etc.). Example defense evasion analysis operations can include an Alter Security Integration operation (e.g. to determine, inter alia: External OAUTH, OAUTH, SAML2, SCIM, etc.). Example defense evasion analysis operations can include an Alter Session Policy operation (e.g. to determine, inter alia: Idle timeout, idle timeout UI, etc.).

In step 2306, process 2300 implements a discovery process. FIGS. 6-10 illustrates an example screenshots 600-1000 of discovery operations, according to some embodiment.

Example discovery process operations include a describe operation. This can include, inter alia: Database, External Table, File Format, Function, Integrations, Masking Policy, Materialized view, Network Policy, Pipe, Procedure, Result, Row Access, Schema, Search Optimization, Sequence, Session Policy, Share, Stage, Stream, Table, Task, Transaction, User, View, Warehouse, etc.

Example discovery process operations include a show operation. The show operations command returns a table with all administrative operations, both running and completed, which were executed in the last two weeks. The command can run in a Log mode where all entries in the log that the user has access to are returned. Multiple records can be returned for a single operation. This mode can be used when the command does not indicate the operation.

tion ID(s). The latest updated record for each operation ID provided by the user can be returned. This mode can be used when the command indicates which operation ID(s) to inspect. This can include, inter alia: Columns, Connections, Databases, Databases in failover group, Databases in replication group, Delegated Authorizations, external functions, external tables, failover groups, file formats, functions, global accounts, grants, integrations, locks, managed accounts, masking policies, materialized views, network policies, objects, organization accounts, parameters, pipes, primary keys, Procedures, regions, replications accounts, replications databases, resource monitors, roles, row access policies, schemas, sequences, session policies, shares, shares in failover group, stages, streams, tables, tags, tasks, transactions, user functions, users, variables, views, warehouses, etc.

Example discovery process operations include an explain operation. This can include, inter alia: execution plan for SQL, etc. Example discovery process operations include an Auth Failures operation. This can include, inter alia: Objects (e.g. Tables, Database, etc.).

Figure 11:
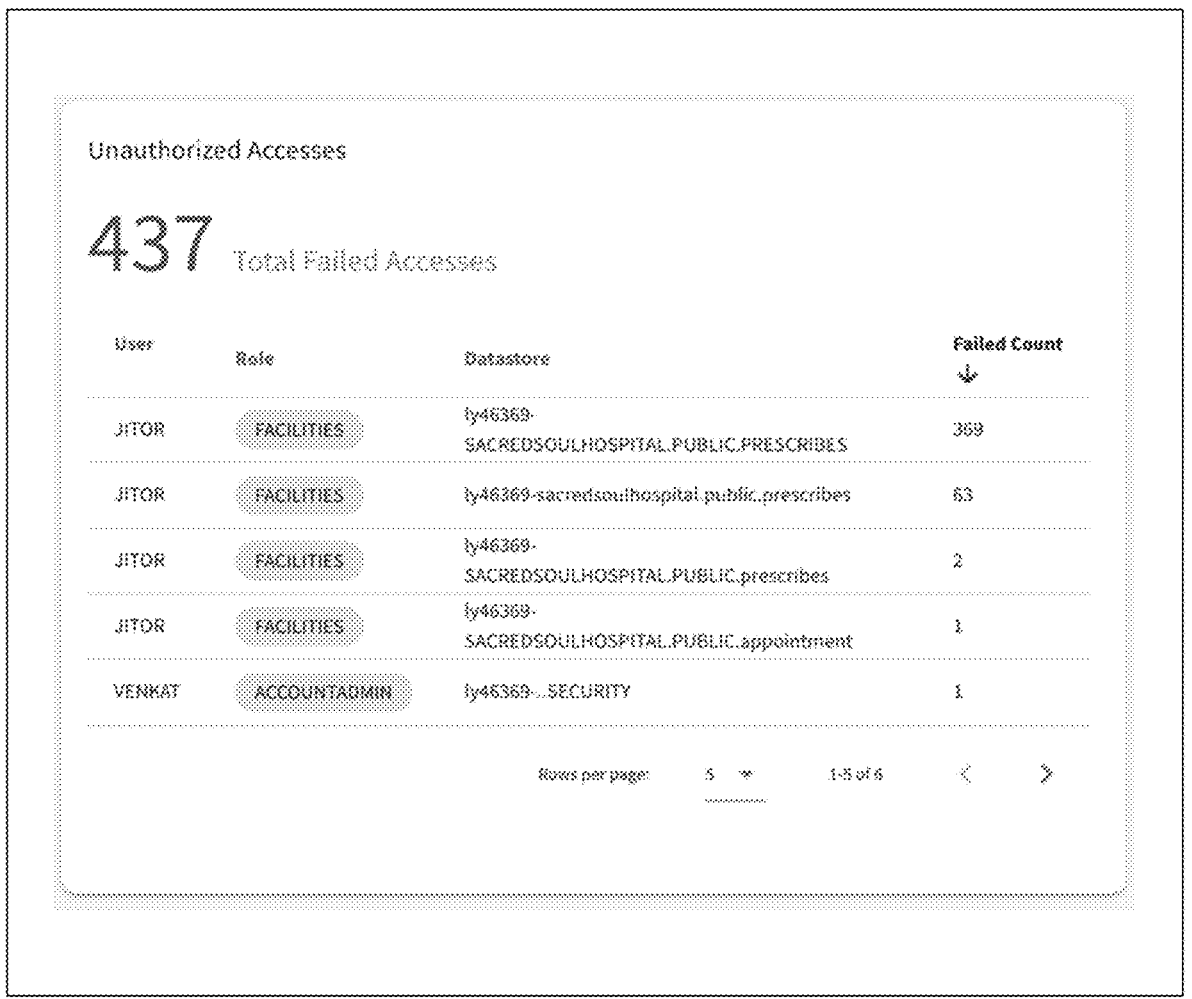
Figure 13:
FIGS. 13-16 illustrate example screenshots of discovery operations, according to some embodiments.
Figure 14:
Figure 15:
Figure 16:

FIGS. 11-12 illustrate example screenshots 1100-1200 of discovery operations, according to some embodiment.

In step 2308, process 2300 implements a data gathering process. FIGS. 13-16 illustrate example screenshots 1300-1600 of discovery operations, according to some embodiment. Within the cloud data warehouse, process 2300 can identify lateral movements. Natively these would translate to using a new database/a new view or a stored procedure or UDF, which the user typically does not use. A situation where the use logins in with credentials that typically do not access a set of tables and views and goes on to access these new resources.

Figure 17:
FIG. 17 illustrates an example screenshot for data collection, according to some embodiments.

FIG. 17 illustrates an example screenshot 1700 for data collection, according to some embodiments. A query text operation can be performed, and text statistics obtained as shown.

Figure 18:
FIG. 18 illustrates an example screenshot for Dynamic Masking, according to some embodiments.
Figure 22:

In step 2310, dynamic masking operations can be implemented. Dynamic Masking column anomalies can be detected (e.g. a same user using different roles, one role that does not have access to the data and another one which has access to the data, etc.). FIG. 18 illustrates an example screenshot 1800 for Dynamic Masking, according to some embodiments.

Step 2310 can detect atypical commands. An atypical command(s) uses features like, inter alia:

row count, columns accessed, like clause, masking, SQL command (e.g. DML command), operators (e.g. arithmetic, comparison, logical/Boolean, set, subquery);

aggregate functions (e.g. general, bitwise, Boolean, hash, semi-structured, linear, statistics and probability, counting distinct values, cardinality estimation, similarity estimation, frequency estimation, percentile estimation, aggregation utilities; Select, Insert, Merge, Update, Delete, Truncate;

Execute SQL operations (e.g. DML table queries); and

3. Execute Immediate operations (e.g. SQL, procedure call, control-flow, block, etc.); etc.

FIGS. 19-22 illustrates example screenshots 1900-2200 illustrating operations to detect atypical commands, according to some embodiments.

An atypical command has variance with respect to the above features. Features like row count being different to history/fingerprint or the SQL command accessing diff columns than past. If the user/application SQL always executed "select a, b, c from table1 where id>100 order by a limit 100" and now if the app executes "select * from table1 OUTPUT TO 'table1.txt'" that is a cause for concern.

Additional Computing Systems

Figure 24:
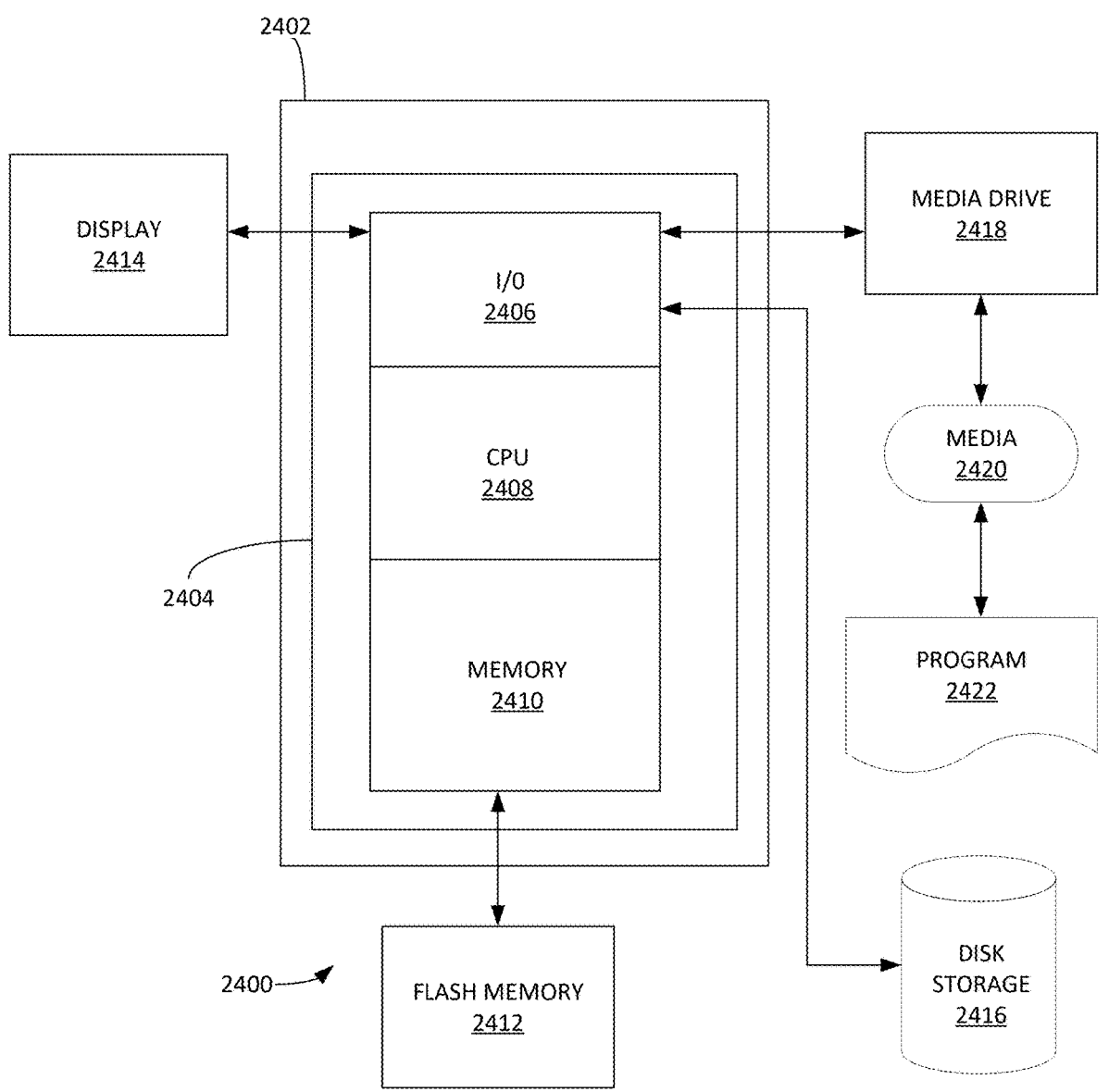
FIG. 24 depicts an exemplary computing system that can be configured to perform any one of the processes provided herein.

FIG. 24 depicts an exemplary computing system 2400 that can be configured to perform any one of the processes provided herein. In this context, computing system 2400 may include, for example, a processor, memory, storage, and I/O devices (e.g., monitor, keyboard, disk drive, Internet connection, etc.). However, computing system 2400 may include circuitry or other specialized hardware for carrying out some or all aspects of the processes. In some operational settings, computing system 2400 may be configured as a system that includes one or more units, each of which is configured to carry out some aspects of the processes either in software, hardware, or some combination thereof.

FIG. 24 depicts computing system 2400 with a number of components that may be used to perform any of the processes described herein. The main system 2402 includes a motherboard 2404 having an I/O section 2406, one or more central processing units (CPU) 2408, and a memory section 2410, which may have a flash memory card 2412 related to it. The I/O section 2406 can be connected to a display 2414, a keyboard and/or another user input (not shown), a disk storage unit 2416, and a media drive unit 2418. The media drive unit 2418 can read/write a computer-readable medium 2420, which can contain programs 2422 and/or databases. Computing system 2400 can include a web browser. Moreover, it is noted that computing system 2400 can be configured to include additional systems in order to fulfill various functionalities. Computing system 2400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and computerized methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for detecting hiding and data intelligence gathering in a data lake or a cloud warehouse, comprising:
    implementing a hiding and data intelligence collection analysis phase in the data lake or the cloud warehouse;
    implementing a discovery process in the data lake or the cloud warehouse;
    implementing a data gathering process in the data lake or the cloud warehouse; and
    performing one or more dynamic masking operations to detect a Dynamic Masking column anomalies and to detect one or more atypical commands in the data lake or the cloud warehouse.

2. The computerized method of claim 1, wherein implementing the hiding and data intelligence collection analysis phase comprises:
    analyzing a hiding and data intelligence collection phase of an attack and implementing a defense evasion analysis using a truncate command.

3. The computerized method of claim 2, wherein the truncate command is implemented on an access_history table, a login_history table and a Query_history table.

4. The computerized method of claim 1, wherein implementing the discovery process in the data lake or the cloud warehouse further comprises a plurality of metadata operations.

5. The computerized method of claim 4, wherein the plurality of metadata operations comprise a discovery operation.

6. The computerized method of claim 5, wherein the discovery operation comprises a show operation.

7. The computerized method of claim 5, wherein the discovery operation comprises an explain operation.

8. The computerized method of claim 5, wherein implementing the data gathering process in the data lake or the cloud warehouse further comprises:

within the cloud warehouse, identifying a plurality of lateral movements.

9. A system for detecting hiding and data intelligence gathering in a data lake or a cloud warehouse, comprising:

one or more processors; and a non-transitory computer-readable medium storing software that, when executed by the one or more processors, cause the one or more processors to perform operations comprising:

implementing a hiding and data intelligence collection analysis phase in the data lake or the cloud warehouse;

implementing a discovery process in the data lake or the cloud warehouse;

implementing a data gathering process in the data lake or the cloud warehouse; and performing one or more dynamic masking operations to detect a Dynamic Masking column anomalies and to detect one or more atypical commands in the data lake or the cloud warehouse.

10. The system of claim 9, wherein the operation of implementing the hiding and data intelligence collection analysis phase comprises:

analyzing a hiding and data intelligence collection phase of an attack and implementing a defense evasion analysis using a truncate command.

11. The system of claim 10, wherein the truncate command is implemented on an access_history table, a login_history table, and a Query_history table.

12. The system of claim 9, wherein the operation of implementing the discovery process in the data lake or the cloud warehouse further comprises performing a plurality of metadata operations.

13. The system of claim 12, wherein the plurality of metadata operations comprises a discovery operation, and wherein the discovery operation comprises a show operation or an explain operation.

14. The system of claim 9, wherein the operation of implementing the data gathering process in the data lake or the cloud warehouse further comprises:

within the cloud data warehouse, identifying a plurality of lateral movements.

15. A non-transitory computer-readable medium storing software that, when executed by one or more processors, cause the one or more processors to perform operations for detecting hiding and data intelligence gathering in a data lake or a cloud warehouse, the operations comprising:

implementing a hiding and data intelligence collection analysis phase in the data lake or the cloud warehouse;

implementing a discovery process in the data lake or the cloud warehouse;

implementing a data gathering process in the data lake or the cloud warehouse; and performing one or more dynamic masking operations to detect a Dynamic Masking column anomalies and to detect one or more atypical commands in the data lake or the cloud warehouse.

16. The non-transitory computer-readable medium of claim 15, wherein the operation of implementing the hiding and data intelligence collection analysis phase comprises:

analyzing a hiding and data intelligence collection phase of an attack and implementing a defense evasion analysis using a truncate command.

17. The non-transitory computer-readable medium of claim 16, wherein the truncate command is implemented on an access_history table, a login_history table, and a Query_history table.

18. The non-transitory computer-readable medium of claim 15, wherein the operation of implementing the discovery process in the data lake or the cloud warehouse further comprises performing a plurality of metadata operations.

19. The non-transitory computer-readable medium of claim 18, wherein the plurality of metadata operations comprises a discovery operation, and wherein the discovery operation comprises a show operation or an explain operation.

20. The non-transitory computer-readable medium of claim 15, wherein the operation of implementing the data gathering process in the data lake or the cloud warehouse further comprises:

within the cloud data warehouse, identifying a plurality of lateral movements.

\* \* \* \* \*